United States Patent [19]
Goldfield et al.

[11] 3,745,748
[45] July 17, 1973

[54] FILTERING PROCESS

[75] Inventors: Joseph Goldfield, North Plainfield; Vincent Greco, Martinsville, both of N.J.

[73] Assignee: Johns-Manville Corporation, New York, N.Y.

[22] Filed: Oct. 29, 1970

[21] Appl. No.: 85,005

Related U.S. Application Data

[63] Continuation-in-part of Ser. No. 869,495, Oct. 27, 1969, abandoned.

[52] U.S. Cl. ................... 55/97, 55/352, 55/354, 55/527, 55/DIG. 16, 55/DIG. 25
[51] Int. Cl. ........................................ B01d 25/24
[58] Field of Search ............. 55/97, 341, 351–354, 55/475, 497, 527, 528, DIG. 16, DIG. 25

[56] References Cited
UNITED STATES PATENTS

| | | | |
|---|---|---|---|
| 1,783,181 | 12/1930 | Birkholz | 55/354 |
| 2,216,986 | 10/1940 | Roe | 55/354 |
| 2,692,654 | 10/1954 | Pryor | 55/527 |
| 2,885,028 | 5/1959 | Sylvan | 55/341 |
| 2,933,154 | 4/1960 | Lauterbach | 55/97 |
| 3,197,946 | 8/1965 | Taylor | 55/97 |
| 3,208,205 | 9/1965 | Harms et al. | 55/527 |
| 3,250,059 | 5/1966 | Vosseller | 55/97 |
| 3,540,190 | 11/1970 | Brink | 55/97 |
| 3,596,440 | 8/1971 | Nutler et al. | 55/475 |
| 3,596,442 | 8/1971 | Neumann | 55/354 |
| 2,881,859 | 4/1959 | Nutting | 55/352 |
| 3,339,351 | 9/1967 | Carmichael, Jr. et al. | 55/528 |

FOREIGN PATENTS OR APPLICATIONS

| 628,115 | 9/1961 | Canada | 55/97 |
|---|---|---|---|

*Primary Examiner*—Bernard Nozick
*Attorney*—John A. McKinney and Robert M. Krone

[57] ABSTRACT

Filtration of submicron liquid and solid particles from large volumes of gas in which the particles are carried is accomplished by passing the gas through a filter medium made up of fibers having an average diameter of up to about 10 microns at a velocity of at least 300 feet per minute and at a pressure drop not greater than 40 inches of water to remove at least 80 percent of such particles.

10 Claims, 14 Drawing Figures

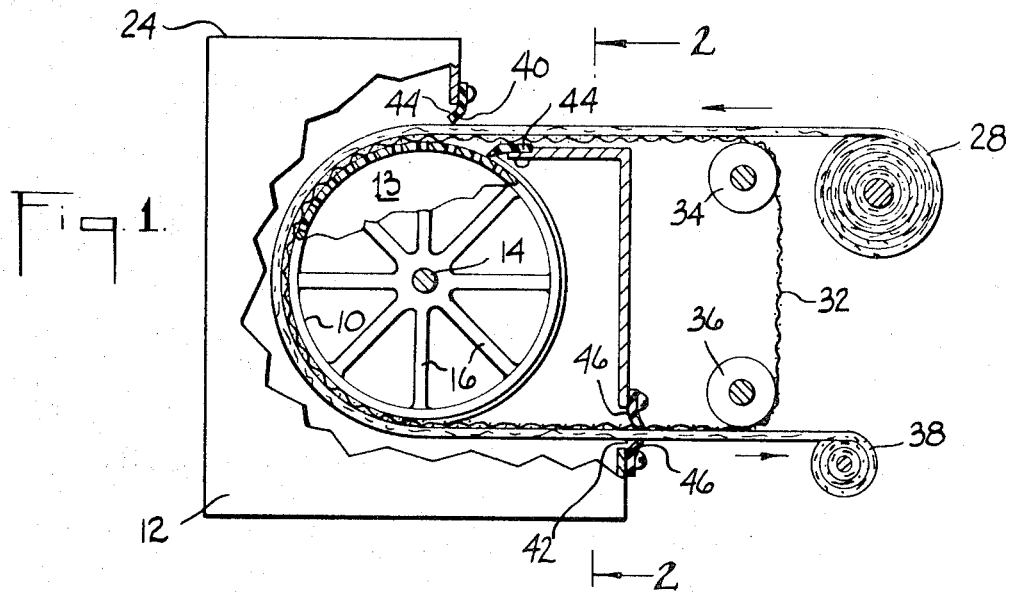
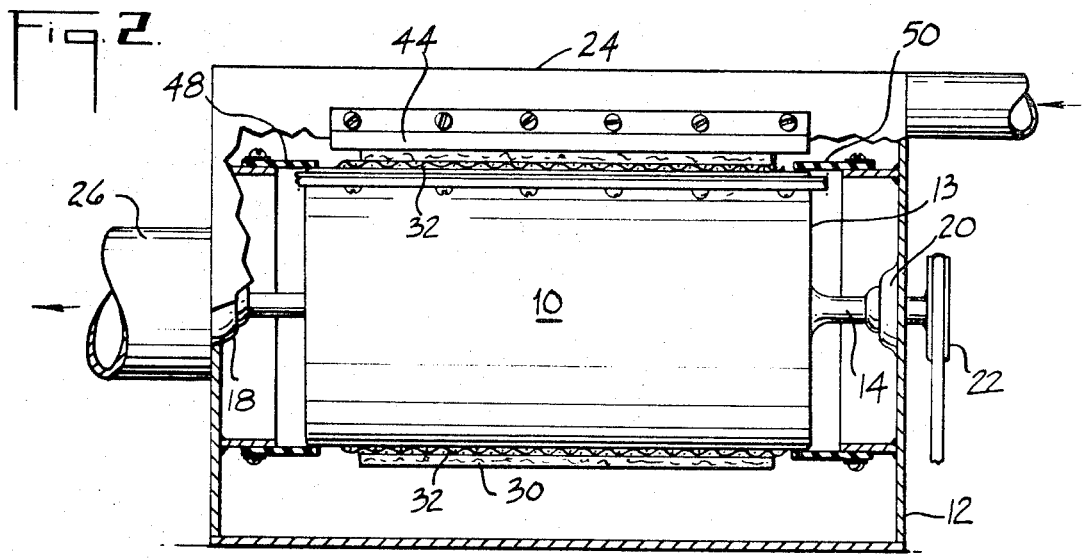
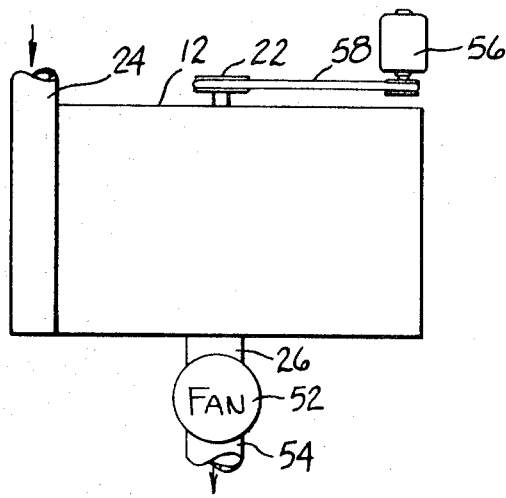
INVENTORS;
JOSEPH GOLDFIELD
VINCENT GRECO
BY John A. McKinney
ATTORNEY

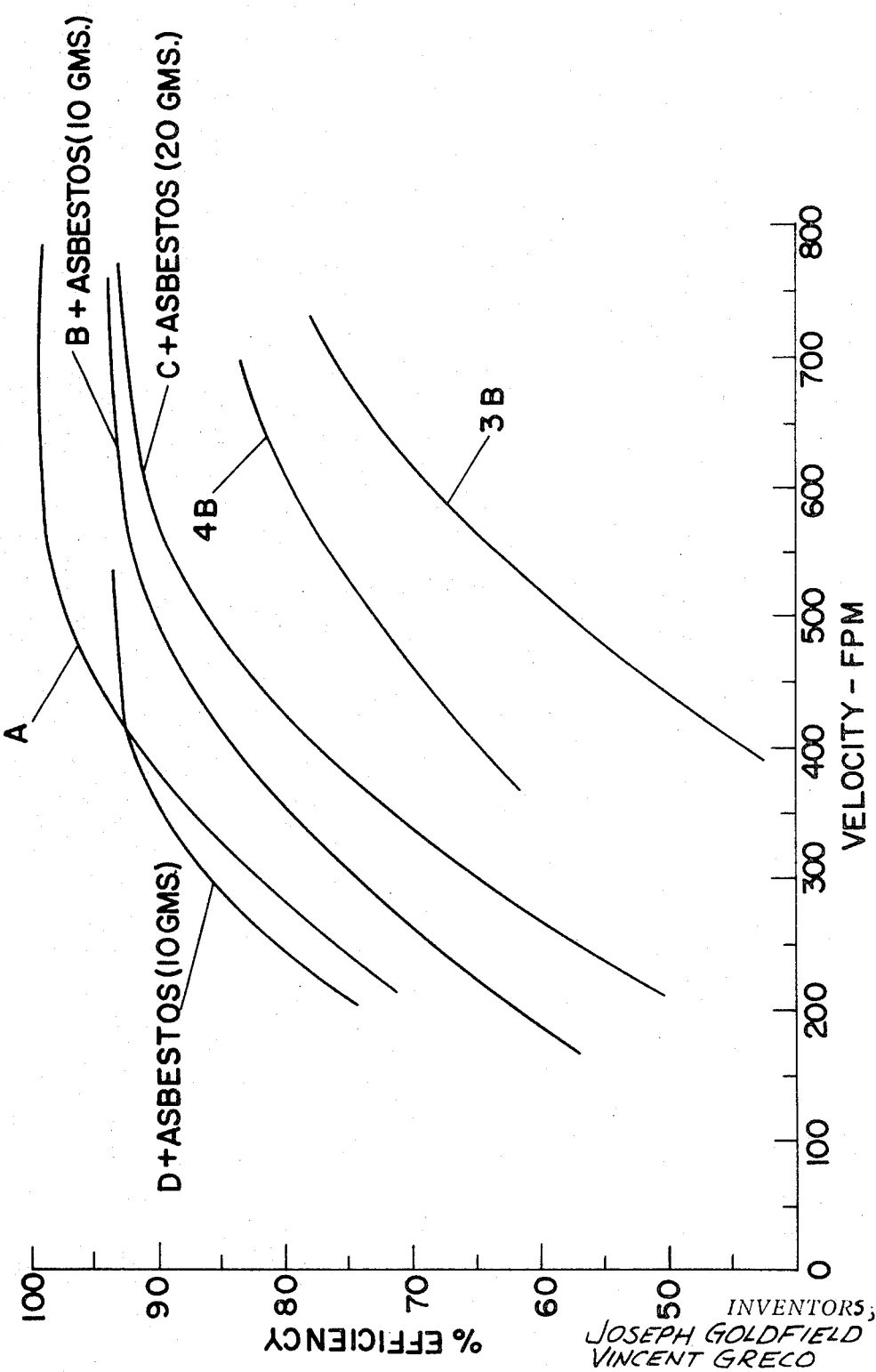

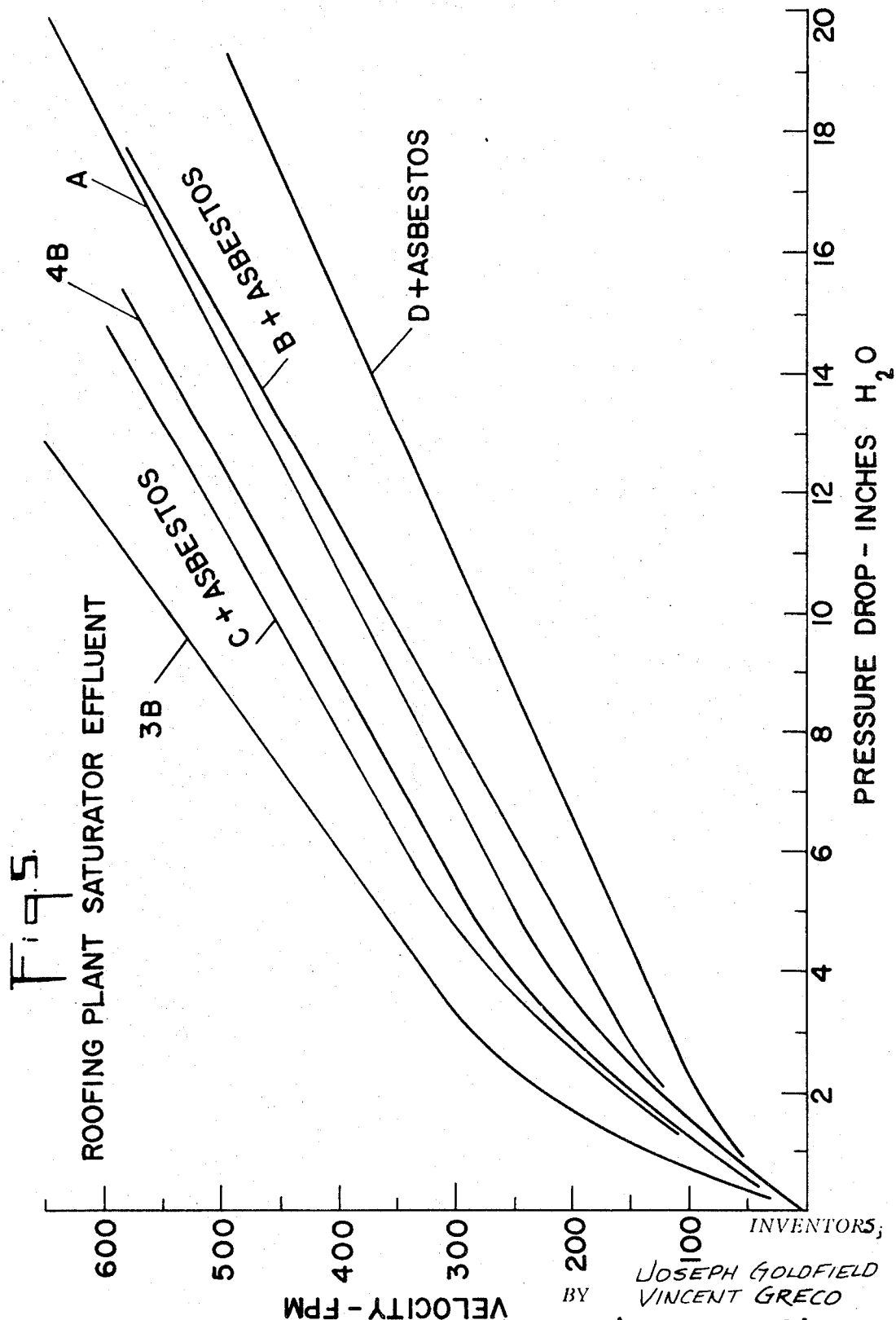

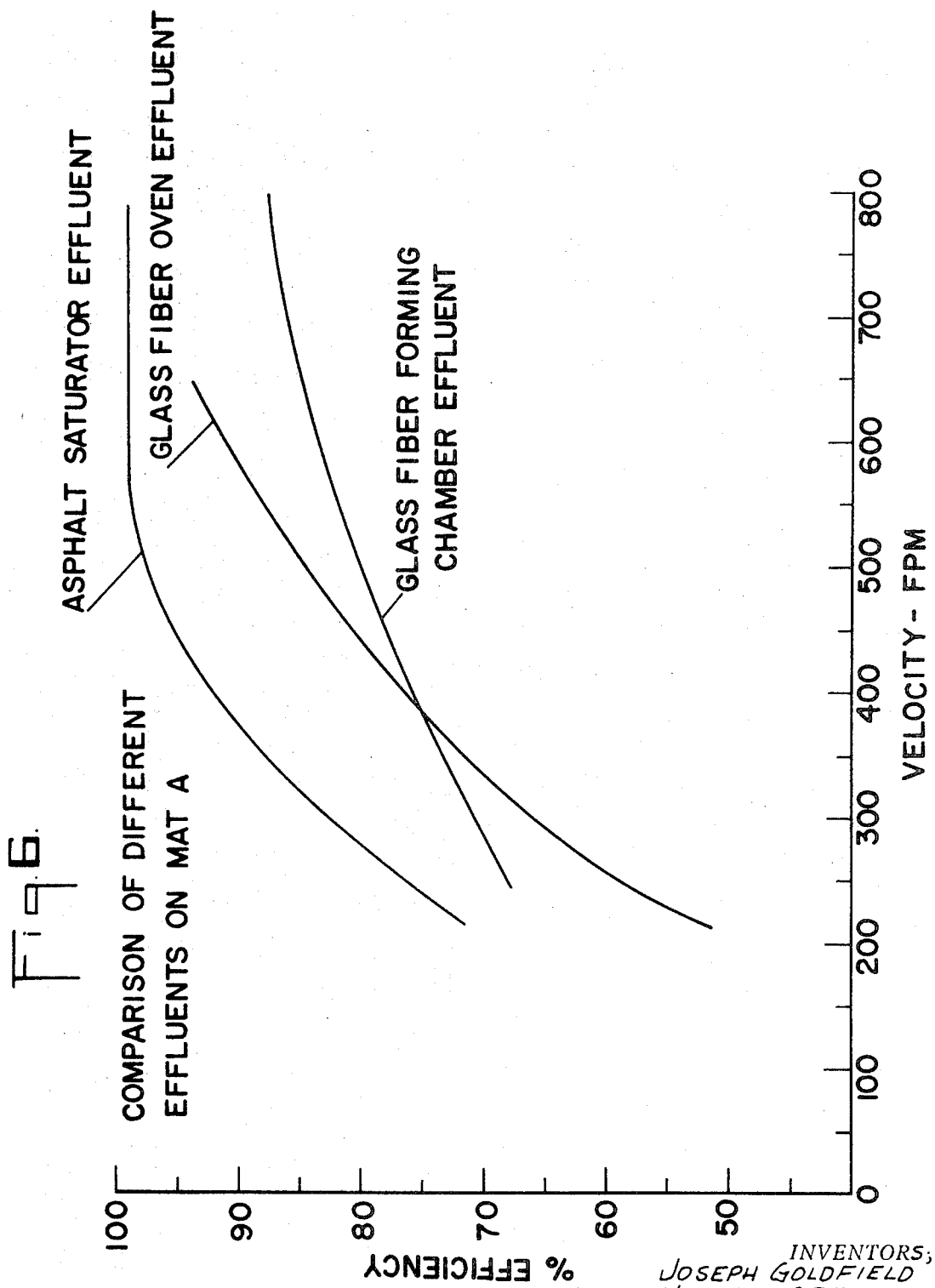

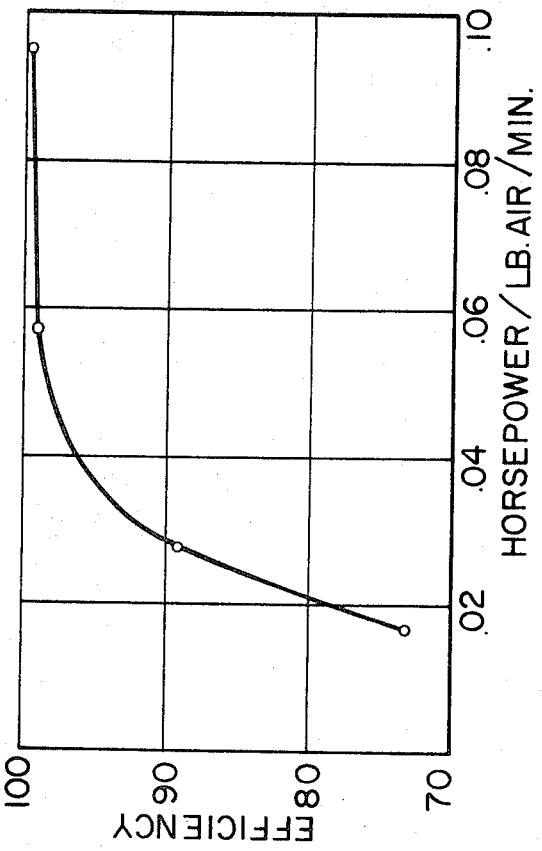
FIG. 13
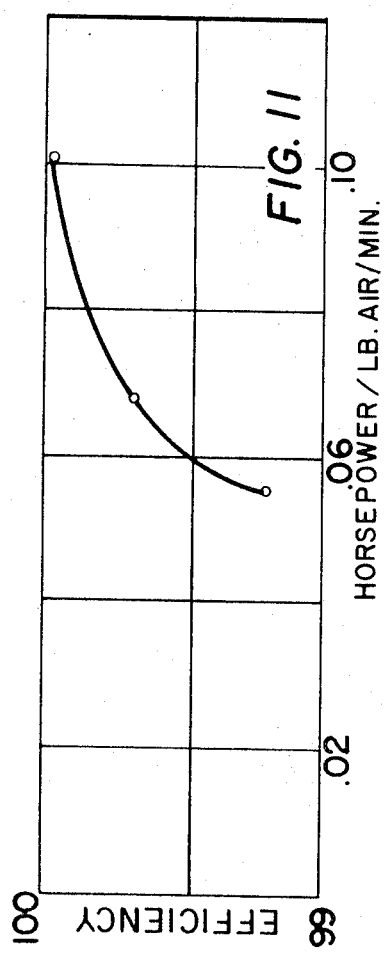
FIG. 11
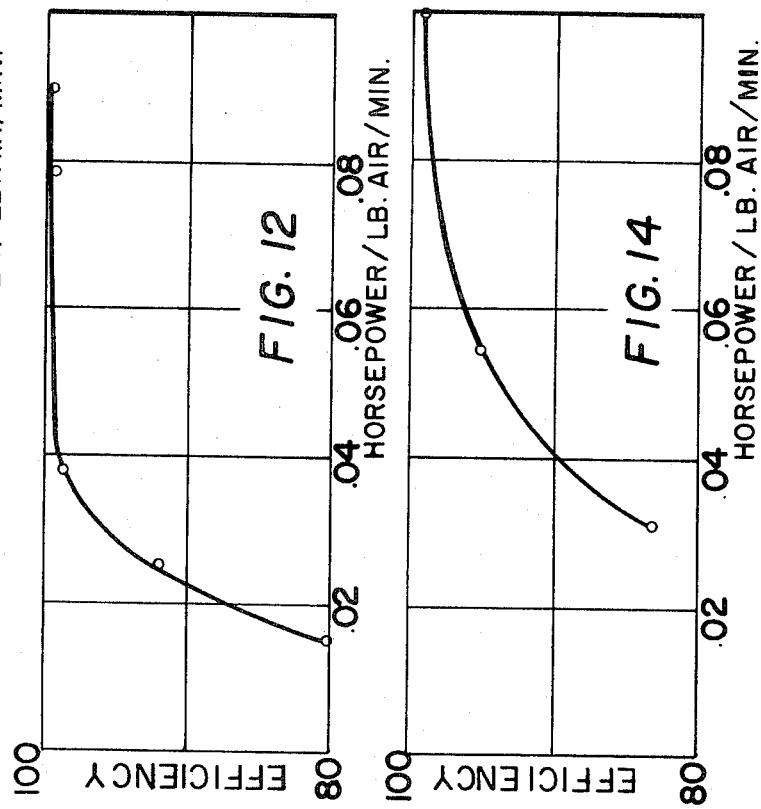
FIG. 12
FIG. 14

FILTERING PROCESS

This application is a continuation-in-part of copending coassigned patent application Ser. No. 869,495, filed Oct. 27, 1969, which is now abandoned for Filtering Process.

FIELD OF THE INVENTION

This invention relates to an improved process for removing particulate matter from a gas stream. More particularly, the invention relates to the removal of submicron and larger liquid and solid particles, but primarily liquid particles of submicron and micron size, from large volumes of air, or other gas, in which the particles are carried.

BACKGROUND OF THE INVENTION

For a long time efforts have been directed towards finding an effective and economical method of preventing the emission of submicron liquid and solid particles into the atmosphere. Such particles make up the bulk of the effluent from many types of industrial operations, including saturators in asphalt roofing plants and curing ovens in plants producing glass fiber insulation incorporating phenolic resin binder. The amounts of effluent produced by such operations are large, typical commercial installations emitting quantities through a single stack of up to 50,000 cubic feet per minute, and more, and they pose a health threat due to the likelihood of inhalation of such small aerosol particles.

Ideally, a method for removing submicron particles should be capable not only of processing large volumes of gaseous flow at a high level of efficiency, but should be economically attractive from the standpoints of capital expenditure, cost of operation and ease of maintainance. To remove submicron particles, however, particularly sticky liquid particles, from large volumes of gas under the above conditions is very difficult. Attempts to do so by use of commonly employed pollution control equipment such as, for example, electrostatic precipitators and wet scrubbers have not been satisfactory. Such equipment of a size required to handle high volumes of effluent is inordinately expensive and the frequent washings required for removal of particles taken from the gas stream cause secondary pollution problems.

Filtration has been widely used to remove contaminants from a fluid carrier and has also been investigated over the years as a method of removing small particles from gas.

The literature relating to such filtration suggests that certain requirements are essential in order to filter effectively with fibrous filter media. One body of prior art as exemplified by U. S. Pat. Nos. 1,099,773, 1,140,198, 1,379,056, and 1,544,950 issued to H. F. Smith suggests that where effluent flow rates must be relatively high, one must use large diameter fiber which will resist the force of the effluent stream tending to compact the filter media. Another body of prior art suggests that where fibers of small diameter are employed effluent velocities must be very low in order effectively to remove submicron particles. Indeed, such art suggests that with small diameter fiber any increase in velocity will result in less effective particle removal. On the other hand, the well-known paper of C. Y. Chen entitled "Filtration of Aerosols by Fibrous Media," Volume 55, Chemical Reviews (1955), suggests that changes in fiber diameter, other conditions remaining the same, do not affect the efficiency of aerosol particle removal at high velocities.

We have found, contrary to the suggestions of the prior art, that close to 100 percent of micron and submicron contaminating particles can be removed from high volume, high velocity, effluent streams by the use of a fibrous filter medium in which the fibers have diameters not sufficiently large to provide the stiffness and resistance to compaction apparently required in similar prior art methods. In addition, we have found that the use of relatively fine diameter fiber quite unexpectedly provides this high efficiency of particle removal with a lower power consumption that is required when relatively coarse fibers are employed under similar operating conditions.

The above referred to Smith patents include teachings that small tar particles can be filtered from a gas stream by maintaining a high pressure drop across the filter, apparently in the range of 1-5 pounds per square inch, with the higher pressures being most effective. The fibers are rather coarse, and must be sufficiently stiff and elastic to retain their shape under the pressures required. Such an operation for filtering the large volumes of effluent from current industrial operations would not be satisfactory from a practical view because the high range of required pressures for the volume of air treated would make the operating cost too great.

Power requirements for filtering small particles from a gaseous stream moving at relatively low velocities ordinarily would not be expensive, but other difficulties dictate against use of such a method. For example, as stated previously it has been suggested to use a filter composed of very fine glass fibers and move the gas stream through the filter at a rate of less than 40 feet per minute to obtain efficiencies above 80 percent. It was further suggested that the efficiency of particle removal decreases with an increase in velocity. Such a method could not feasibly handle the high volumes of effluent encountered in industry.

There has been little found in the literature to instruct one to modify known filtration techniques to permit practical removal of submicron aerosol particles from high volumes of gas. The interrelationships between (a) properties of a fibrous filter medium, such as fiber diameter, interstice or pore size, and material of construction; (b) flow properties of a two-phase gaseous stream including submicron liquid particles; (c) the velocity of the gas stream during the removal process; and (d) the results desired such as the power consumed during the removal operation and the percent of the particles which are removed, are largely unexplained. There are recognized disclosures, however, of the various types of filtration methods available. One such disclosure appears in the Chen paper referred to above, which discusses the diffusion theory, exemplified by the low velocity method discussed above, and the inertial impaction theory, dealing with high velocity filtration such as disclosed in the Smith patents identified above. The mechanism by which particles are removed from a gaseous stream differs greatly from one method to the other, and we do not find in Chen any hope of striking a compromise of the two while still operating at a high efficiency in terms of percent of particle removal. In fact, his teaching to the effect that a change in fiber diameter, other operating conditions remaining constant, could have no effect on the efficiency of particle removal in high velocity ranges, would lead one to believe that the known methods of filtration through fibrous media could not be altered to accommodate industry requirements for submicron removal.

Thus prior to the present invention one faced with the problem of economically filtering submicron particles from a gaseous stream of high volume apparently had only such unsatisfactory alternatives of wet scrubbers or electrostatic precipitators. Filtration through fibrous media appeared not to provide hope for a solution because of its excessive power requirements at high velocities of flow and its apparent economic inability to handle large volumes of gas at low velocities of flow.

OBJECTS OF THE INVENTION

An object of the invention is to efficiently remove submicron particles, that is, at least 80 percent of them, from large quantities of gas by means of a fibrous filter medium at economically feasible power consumption rates and at relatively high volumetric flow rates.

It is another object of the invention to purify gas by removing submicron and larger particles by a process employing apparatus that is easy to operate, relatively small in size and capable of being incorporated into existing plants.

A further object of the invention is to remove submicron particles from a gas by a method which poses little if any secondary pollution problem.

A still further object is to utilize commercially available and relatively inexpensive filter media in gas purification.

Yet another object of the invention is to remove submicron particles from gas by a method which is easily adaptable to remove substantially all such contaminants in order to comply with present anti-pollution standards and with more strict standards as they are enacted.

SUMMARY OF THE INVENTION

It has been found that a porous gas pervious filter medium made up of fibers having an average diameter of up to about 10 microns can be used to remove substantial amounts of pollutants from gas, and in particular liquid particles of submicron as well as larger size from effluent streams, at relatively low power consumption rates when operated under certain conditions. High efficiencies (as hereinafter defined) of removal of particles, 80 percent and above, have been readily accomplished by moving the gas through the fibrous filter medium at a velocity in the range from about 300 feet per minute to a maximum velocity at which the pressure drop across the filter medium does not exceed about 40 inches of water. Glass fibers having average diameters of up to about 10 microns have been found to be particularly effective as a filter medium when operated under the above conditions.

The present method provides an economically feasible filtration technique for removing submicron particles from large quantities of gas at power consumptions, expressed on a horsepower per pound of gas per minute basis, below those of prior filtration practices at comparable levels of efficiency.

It has been found in general that when using fibers having diameters in the lower portion of the diameter range, desired efficiencies can be attained at velocities within the lower portion of the velocity range whereas fibers having diameters in the upper portion of the range can attain these efficiencies at velocities in the upper portion of the velocity range.

The present process is preferably practiced using a filter medium commercially available and relatively inexpensive glass fibers in the form of a mat or as bulk fibers, for example glass fiber insulation. Such material provides significant cost savings because of its low initial cost on a per-square-foot basis, because at high velocities each square foot of the medium is capable of handling a large flow of gas and because the filter medium has a desirable operating life.

The physical size of a system capable of carrying out the process of this invention, including the filter medium and related duct work, is relatively small in comparison to other processes, such as those employing electrostatic precipitators, since the invention utilizes high gas velocities and hence is capable of processing large volumes of gas. The relatively small size of the necessary equipment makes the process of the invention particularly attractive for use in existing plants, with limited available space, which are faced with removing submicron particulate matter from high volumes of effluent.

The method of this invention can be used to remove submicron particles over a wide range of efficiencies. Operation at 80 percent efficiency is satifactory for certain types of effluents, while operation at 90 percent efficiency usually is satisfactory for most types of effluents and can readily be attained. Efficiencies of over 99 percent are also attainable and would appear to be attractive for installations requiring substantially complete removal of submicron particles from a gas stream. As disclosed hereinafter, filtration systems can be designed by selection of appropriate operating conditions and filter medium to remove submicron particles at desired levels of efficiency.

The term "filtration" as used in this specification and claims is used in its broadest sense to include purification of a gas by removing contaminant particles therefrom whether by a sieving action, by direct interception, by diffusion or by the forces of inertia or gravity.

The term "efficiency" is intended to mean the percent of the particles originally present in the gas which are removed during filtration. A related term used to describe particle removal is penetration, which in percent equals 100 — efficiency.

The term "average diameter" when referring to fiber diameter is used in the sense of the conventional arithmetic or mean diameter obtained by averaging the results of a microscopic determination.

The term "horsepower" as used in this application refers to the actual calculated energy loss of the gas as it passes through the filter. The power consumption expressed as horsepower per pound air filtered per minute is calculated from the following expression:

$$\frac{\text{pressure drop } \frac{(\text{lb.})}{\text{in.}^2} \times \text{Filter area (in.}^2) \times \text{velocity } \frac{(\text{ft.})}{\text{min.}}}{33,000 \times \frac{(\text{ft.-lb.})}{\text{horsepower}} \times \frac{\text{lb. air through filter}}{\text{min.}}}$$

wherein lb air through filter/min equals cubic feet of air per minute through filter $x$ air density.

BREIF DESCRIPTION OF THE DRAWINGS

The nature of the invention will be more fully understood and other objects may become apparent when the following detailed description is considered in connection with the accompanying drawings, wherein:

FIG. 1 is a schematic representation of a rotatable drum on which filter media can be mounted;

FIG. 2 is a sectional view taken on line 2—2 of FIG. 1;

FIG. 3 is a schematic representation of the conduit system leading to and from the filter medium;

FIG. 4 is a graphical representation of the performances of various types of filter media;

FIG. 5 is a graphical representation, with respect to the filter media represented in FIG. 4 of the relationship between velocity of gas stream and pressure drop across the filter;

FIG. 6 is a graphical representation of the performance of the same filter media with respect to different effluents;

FIG. 11 is a graphical representation of the relation between efficiency and power expended for the filter medium used in FIG. 7;

FIG. 12 is a graphical representation similar to FIG. 11 but for the filter medium used in FIG. 8;

FIG. 13 is a graphical representation similar to FIG. 12 but for the filter medium used in FIG. 9;

FIG. 14 is a graphical representation similar to FIG. 13 but for the filter medium used in FIG. 10.

DETAILED DESCRIPTION OF THE INVENTION

Figure 8:
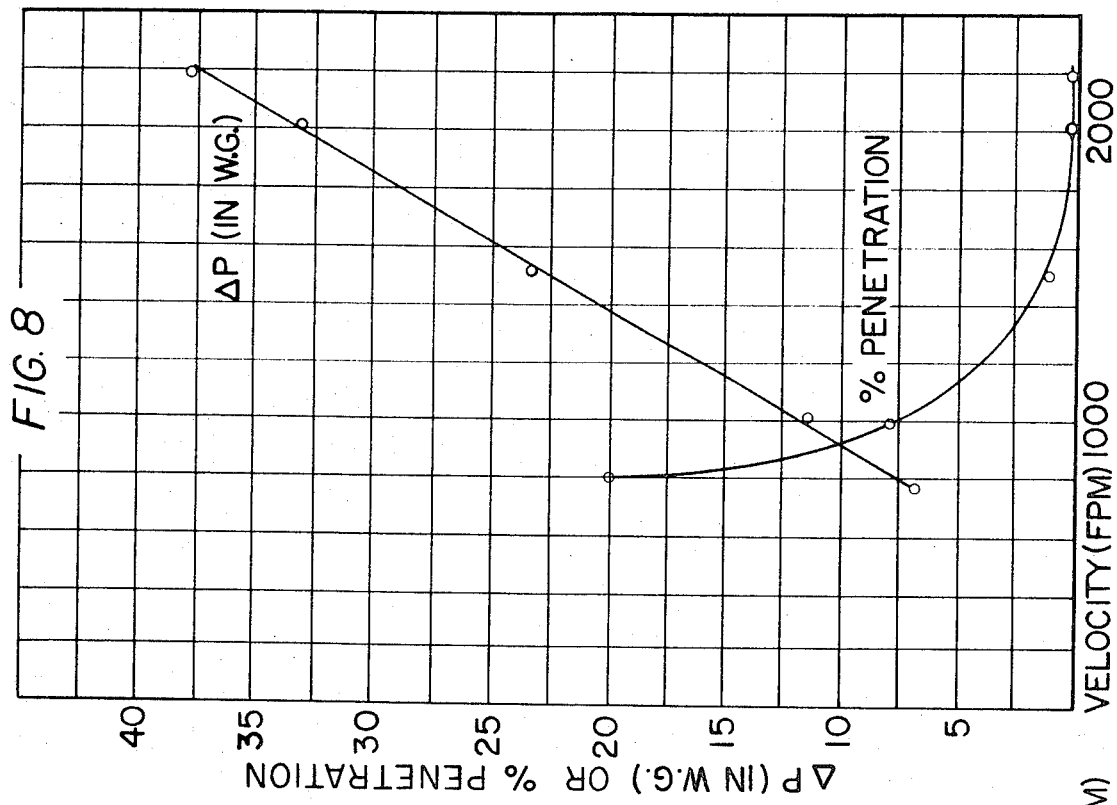
FIG. 8 is a graphical representation similar to FIG. 7 but for another embodiment of a filter medium which can be used in the invention wherein both pressure drop and penetration are plotted on the same scale.

The filtration process of this invention is concerned with removing submicron as well as larger particles from gas streams at relatively low power consumption rates and at high efficiency rates by utilizing a filter medium formed of fibers having average diameters of up to about 10 microns. Efficiencies of 80 percent and higher have been attained at gas velocities above about 300 feet per minute. In general, for a given filter medium the higher the pressure drop the higher the velocity. Higher pressure drops usually result in higher power consumption rates which are economically unattractive. From a cost consideration, for manually acceptable particle removal efficiencies, in the range of 80 percent – 90 percent drops above about 30 inches of water are undesirable, while pressure drops above about 40 inches of water are undesirable for efficiencies approaching 100 percent. Maximum velocities above 3,000 feet per minute (fpm) have been attained and velocities up to about 4,000 fpm are capable of being reached at the limits of the pressure drop range. The pressure drop and velocity actually employed depend upon several factors, including the type, density and thickness of the filter medium selected and the desired efficiency of collection.

By maintaining the operating parameters within the ranges set forth in this invention, sub micron particles, especially liquid particles present as a fog or mist, can be removed from a gas at significant power savings. When it is considered that an industrial plant typically is faced with purifying gas effluents which can range above 50,000 cubic feet per minute for each stack and that a plant having a number of such stacks to be treated is not uncommon, and further that a substantial amount of power is required to handle such high volmetric flow rates, it is apparent that power consumption savings are significant. Thus, if a savings in power consumption on a horsepower per pound of air per minute basis could be effected, savings on the order of many thousands of dollars could be achieved. The results of tests run within the process conditions of this invention have shown that high efficiencies in terms of removal of submicron particles can be attained at economically attractive power consumption rates.

To illustrate the advantages of the practice of the invention, a series of controlled filtering operations were carried out in connection with the collection of submicron aerosol particles. The general procedure and apparatus described immediately below were utilized in conducting the operations which provided the data shown in FIGS. 7 to 14.

A dioctyl phthalate (hereafter DOP) aerosol was generated by a DOP generator manufactured by Air Techniques Inc. which produces a DOP smoke having an average particle diameter of about 0.5 – 0.7 micron and a range of particle diameters between about 0.1 and 2.0 microns.

The apparatus used in filtering the DOP particles and measuring the efficiency of the technique comprised a test section of duct, a screen support extending across the duct for supporting the filter media, a blower, a Venturi flow meter, and associated duct work with gas sampling probes positioned upstream and downstream of the screen support. A U-tube manometer was connected across the filter to measure pressure drop. Per cent penetration of the effluent through the sample was measured on a light scattering instrument manufactured by Air Techniques Inc., Model TDA which is similar in operation to a smoke photometer. The sampling probes are positioned and connected to the light scattering instrument so that the gas flows through a 200 mesh filter screen prior to entering the measuring instrument. This arrangement precludes measuring large reentrained drops of liquid emitted from the filter media. During the following tests, no such drops were observed on the screen.

The samples (8 in. nominal diameter discs) were supported by a screen. Except for one sample hereinafter noted, the samples were compressed by the air flowing through them. The tests and corresponding results are described in the following paragraphs. It should be noted that the particles removed from the air stream are liquid in nature and under the operating conditions of the tests used to develop the data for the curves of FIGS. 7–4 the air stream was filtered under coalescing conditions. In other words, liquid particles filtered from the air stream coalesced within the filter medium and larger droplets, much greater in size than the particles entering the filter medium, were blown or dropped by gravity from the medium. Such large droplets are readily collected by conventional means, such as by a mist eliminator.

Figure 7:
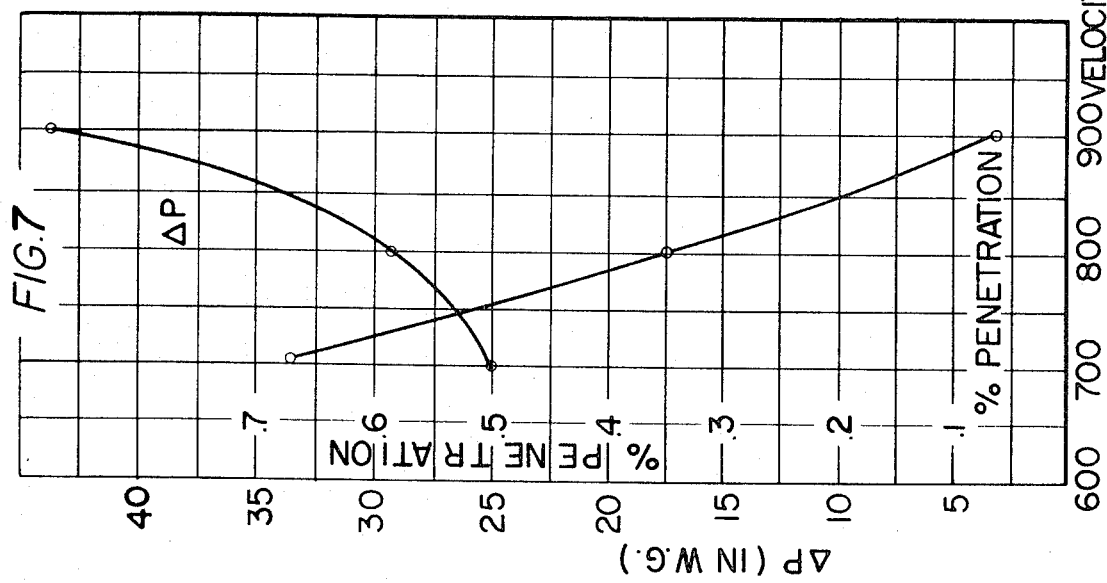
FIG. 7 is a graphical representation of the relation of pressure drop and penetration to gas velocity for one embodiment of a filter medium which can be used in the invention.

In one filtering operation, the DOP aerosol was passed through a mat formed of bonded glass fibers having an average diameter of about one micron, known in the industry as AA fibers. The mas was one-fourth inch thick. This fine fiber mat was supported by a 10 × 10 to the inch scrim backing. Gas velocities were varied and at each test velocity, the pressure drop in inches water gauge (in. w.g.) and the percent penetration were measured. FIG. 7 is a graphical representation of the test data. It can be seen from FIG. 7 that very high efficiencies, over 99 percent, can be obtained using one micron fiber mats at velocities in the range of about 700–900 feet per minute and at pressure drops above 25 inches water gauge (in. w.g.). It is noted that at a velocity of 900 fpm, a pressure drop of 43.7 in. w.g. was measured. Such a high pressure drop is undesirable from an economic and operating standpoint in the filtration of large volumes of gas. The horsepower consumption for the operating conditions of this test are shown in FIG. 11 as a graphical representation of the relationship of efficiency and power consumed per pound of air filtered per minute. From this figure it can be seen that even at extremely high efficiencies, the power consumption was comparatively low, for example, about 0.06 horsepower/lb. air/minute at an efficiency of about 99.5 percent. This test confirms the commercial practicality of this invention since large amounts of submicron particles can be removed from gas streams at low operating costs.

In another filtering operation conducted in accordance with the present invention, the DOP aerosol was passed through a mat formed of bonded glass fibers having an average diameter of about 4.5 microns. The mat used is sold by Johns-Manville Corporation under the name "MICROLITE." Similar mats formed of fibers having an average diameter in the range of about 3 to about 5 microns would produce results similar to those obtained in this test. FIG. 8 shows the relation of velocity and penetration and also the relation of velocity and pressure drop when the DOP aerosol is passed through a mat of this type which has a nominal thickness of one inch, an uncompressed density of 0.5 pound per cubic foot, a thickness after air compression at a velocity of 2,000 fpm of about 0.15 in. and a 2.45 pounds per cubic foot density after air compression. This test shows that 90 percent efficiencies can be attained at a high velocity (about 900 fpm) and low pressure drop (about 10 in. w.g.). At efficiencies lower than 90 percent but still in the high range, the pressure drop decreases. Thus, at approximately 80 percent efficiency a pressure drop of only approximately 7 in. w.g. is required at a velocity of approximately 800 fpm. It is also significant that efficiencies over 95 percent can be attained at reasonable pressure drops. For example, an efficiency of 98.9 percent is achieved at a pressure drop of about 23.3 in. w.g. and at a high velocity of about 1,500 fpm. It should also be recognized that such operating conditions require small power consumption even at these high efficiencies. Efficiencies very close to 100 percent, that is, 99.82 were obtained at a velocity of 2,190 fpm and at a pressure drop of about 38.5 in. w.g.

FIG. 12 is a graphical representation of the power consumption shown as a relationship between efficiency and power consumed per pound of air filtered per minute. It can be seen that an efficiency of about 90 percent requires only about 0.025 hp/lb. air/min. and at 95 percent efficiency, the power consumption is only slightly above 0.03. As is the case with mats of 1 micron fibers, these tests show the practicality of using 4.5 micron glass fibers to achieve high efficiencies at acceptable power consumption rates.

Figure 9:
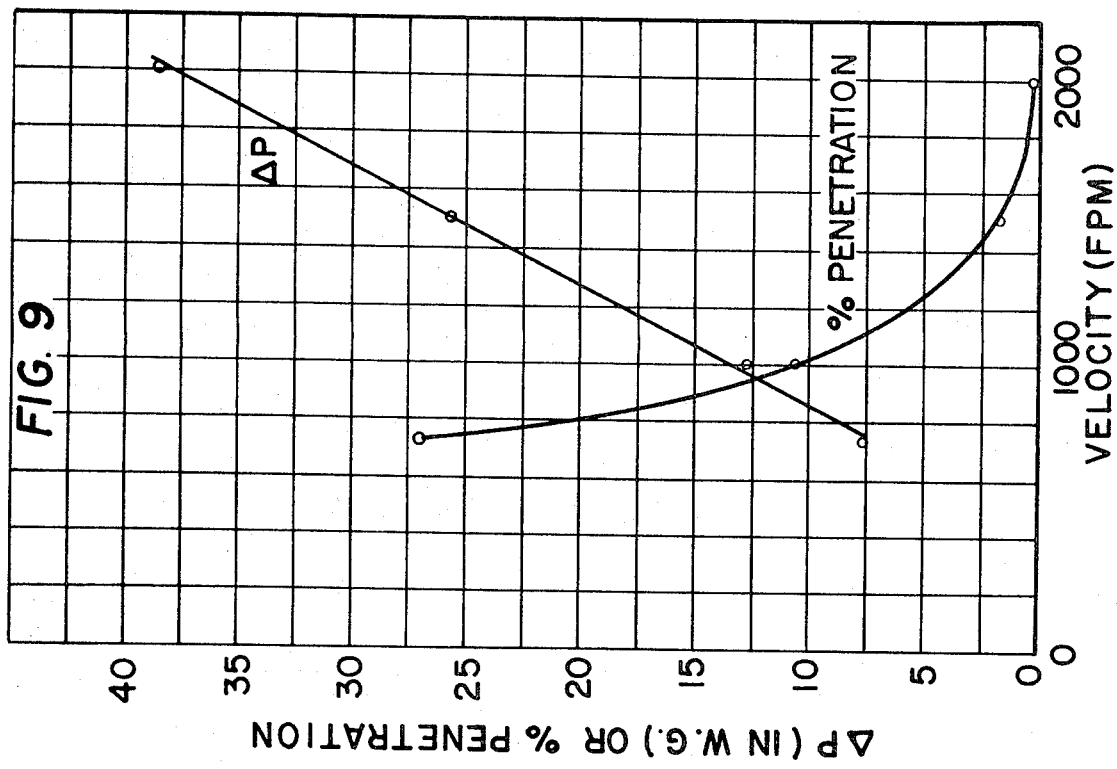
FIG. 9 is a graphical representation similar to FIG. 8 but for a third embodiment of a filter medium which can be used in the invention.

In another filtering test, a DOP aerosol was passed through a filter medium formed of bulk unbonded glass fibers having an average diameter of approximately 8.5 microns. FIG. 9 shows the relation of face velocity and penetration and also the relation between velocity and pressure drop when the aerosol is passed through a sample mat of this type weighing 29.8 grams and having a thickness after compression of about one-half inch and a compressed density of about 4.20 lbs. per cubic feet. It can be seen that the velocity ranged between about 720 fpm to about 2,000 fpm and the pressure drops were about 7.7 to about 38.4 in. w.g. At the maximum velocity and pressure drop, efficiencies above 99 percent were obtained. The horsepower requirements for the range of velocities and pressure drops is shown in FIG. 13 as a graphical representation of the relation between efficiency and power consumed per pound of air filtered per minute. The power consumption for 80 percent efficiency was low, only about 0.020 hp/lb. air/min. and at 90 percent efficiency the power requirement increased to only about 0.028. Even at efficiencies above 95 percent, the power consumption was within acceptable levels.

Figure 10:
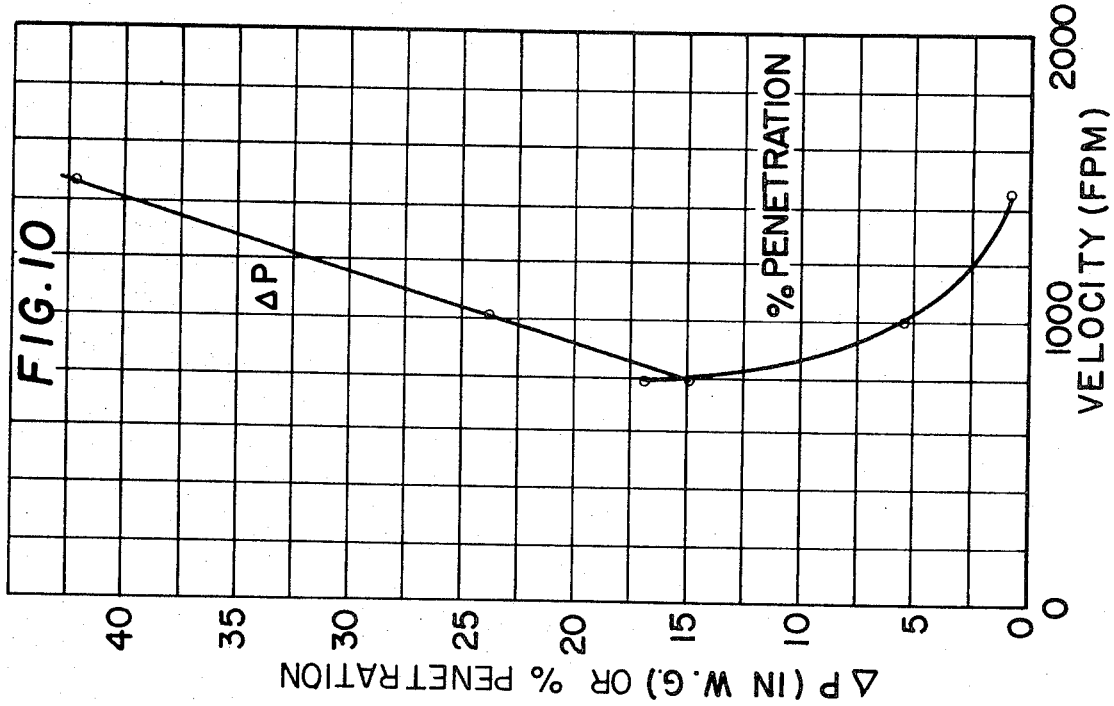
FIG. 10 is a graphical representation similar to FIG. 9 but for a fourth embodiment of a filter medium which can be used in the invention.

Another test was run with fibers having an average diameter of about 10 microns. These fibers were is bulk unbonded form and in order to be used in the test apparatus had to be pre-compressed by means of a screen. The compressed thickness was about 0.30 in. and the compressed density was about 9.25 lbs/cu. ft. Since tests have shown that substantial differences in density have little effect on the performance of a particular filter medium, the test data can be considered representative of lower density filters formed of such 10 micron fibers. The results of the test are shown in FIG. 10 and it can be seen that the velocity ranged between about 780 fpm to about 1,460 fpm and the pressure drop ranged between about 14.9 to about 42.1 in. w.g. The efficiencies ranged between about 83 and 99 percent. In order to reach 99 percent efficiency, however, the pressure drop required was above 40 in. w.g. While the efficiency when compared to velocity and pressure drop appears to be practical, with the exception of above about 99 percent efficiency, the power consumption approaches undesirable amounts. Power consumption is shown in FIG. 14 and from the figure it can be seen that more power is required to achieve comparable efficiencies (e.g. 80 percent, 90 percent, 95 percent and 99 percent) than is needed with glass fibers having diameters of 1, 4.5 and 8.5 microns. These tests show the results obtained at the operative limits of this invention.

In another illustration of the invention, controlled filtering operations were carried out in connection with the collection of submicron aerosol particles from industrial effluents. The effluent gas was directed through a 5-inch diameter duct leading into a 14-inch diameter cylindrical housing in which the test filter material was located, and was directed away from the housing through another 5-inch diameter duct. The filter extended across the diameter of the housing at right angles to the flow of gas and was sealed between its periphery and the housing to prevent gas leakage around the outside of the filter. The gas was pulled through the system by an exhaust fan to which the second duct was connected. A U-tube manometer was connected across the filter to measure pressure drop. An aperture in the first duct was used to draw off effluent samples for odor and efficiency tests, and another aperture in the second duct was used to draw off samples for the same purpose, as well as for making pitot tube traverses to determine gas flow velocity. Temperature readings were also taken and used to compute the velocity as of a common temperature.

A Sinclair-Phoenix photometer was used to determine the efficiency of collection. It was set to read at 100 percent when samplings of the unfiltered gas were taken. Readings of filtered gas were in percentages of the full pré-filter intensity.

FIG. 4 shows a composite of curves representing the relationship of efficiency of particle removal to velocity of the gas stream in connection with the use of various types of filter media. The gas was the effluent from the saturator in an asphalt roofing plant and contained submicron aerosol particles of asphalt oils. The different types of filter media represented by the curves are indicated by letters A, B, C and D, all of which refer to glass fiber mats bonded by phenol-formaldehyde resins. A is a one inch thick mat having a density of 0.6 pound per cubic foot and containing fibers having a diameter of about 1 micron. B is a 1 inch thick mat having a density of 0.95 pound per cubic foot and containing fibers having a diameter of about 3 to 4 microns. C is a mat having a thickness of 1.5 inches and a density of 0.35 pound per cubic foot and containing fibers the diameter of which is about 4 to 5 microns. D is a mat having a thickness of about 0.03 inch, a density of about 7.8 pounds per cubic foot and fibers having a diameter of about 10 microns. In some instances, mats were stacked upon each other. Where the letter is preceded by a number, it indicates the number of stacked mats which were used as the filter. Where asbestos is indicated as being used, it refers to the addition to the filter medium of loose asbestos fibers, in the amount shown, by means of introducing the asbestos fibers into the gas stream at a point upstream from the filter. The asbestos fibers are carried by the gas stream and are lodged in place in an interfelted manner on the glass fiber mat. The use of asbestos fibers in connection with glass fiber mats to form a composite filter medium represents one readily available, very small diameter fiber that can be combined with a filter medium formed of larger fibers to improve the overall performance of the resulting medium. Use of asbestos fibers for this purpose is not recommended over other types of suitable fibers but is merely illustrative of various types of fibers that could function in a similar manner.

FIG. 5 shows a composite of curves representing the same types of filter media as are represented in FIG. 4, but depicts instead the relationship between velocity and pressure drop. Relationships between efficiency, velocity and pressure drop can thus be determined by reference to both figures.

As shown in FIG. 4, mat A was the most efficient single filter medium in this test. Its efficiency at a gas stream velocity of 300 feet per minute was approximately 82 percent. As is apparent from FIG. 5, the pressure drop corresponding to this gas stream velocity is about 7.5 inches of water. The efficiency of this filter, as in the case of the other filter media, increases with increased velocity and increased pressure drop. The high efficiency of this material can be seen by comparing it with curve 3B which represents three glass fiber mats the total thickness of which is six times as great as the thickness of mat A. Mats 3B required a velocity of about 620 feet per minute and a pressure drop of about 12 inches of water to reach 70 percent efficiency. It is noted that the use of four mats, represented in the figures by curves 4B, resulted in higher efficiencies than with lesser thickness of the same material.

Because mat C was much lower in density and was comprised of even coarser fibers than mat B, finer fibers in the form of asbestos fibers, were added in the manner described above. The same was done with mat B for sake of comparison. As shown in FIG. 4, a single thickness of mat B which contained additionally 10 grams of asbestos fibers was more efficient than three and four thicknesses of the mat without asbestos fiber. Mat B was also more efficient than mat C, which contained asbestos, even though mat C was 50 percent thicker than mat B. The glass fibers in mat C, however, were slightly greater in diameter than those in mat B and the density of the mat was only somewhat more than one-third the density of mat B. The pressure drop across the asbestos-containing mat B was slightly more than b 8 inches of water at a gas stream velocity of 300 feet per minute, while asbestos-containing mat C required a velocity close to 380 feet per minute in order to maintain a similar pressure drop. At these conditions, both mats performed at approximately 75 percent efficiency.

Even mat D, a very thin, relatively high density mat formed of glass fibers having a diameter at approximately the upper limit of the diameter range of this invention, when combined with asbestos fibers showed high filtering efficiencies. Efficiency was about 85 percent, for example, at a gas stream velocity of 300 feet per minute and a pressure drop of about 11 inches of water.

In FIG. 6 the performance of mat A is illustrated with respect to three different types of effluents, each of which consists mainly of submicron organic particles. The particles emanating from the forming chamber and curing oven of a glass fiber manufacturing plant are composed of phenol-formaldehyde, and the particles from the asphalt saturator in an asphalt roofing plant are composed of asphalt oils. The phenol-formaldehyde particles are smaller than the particles of oil, which accounts to a major degree for the greater efficiency at lower gas velocities exhibited in collecting the oil particles than in collecting the phenol-formaldehyde particles.

FIGS. 1 – 3 schematically illustrate one form of apparatus which can be used to carry out the process of the invention and is especially effective for removing viscous liquid or solid particulate matter. A hollow drum 10 having a gas pervious peripheral wall of any suitable construction, such as a perforated metal plate, is mounted for rotation within a housing 12. The near side of the housing 12 is shown partly broken away in FIG. 1 in order to permit ready illustration of drum 10. As shown in FIGS. 1 and 2, the housing 12 encloses drum 10 with openings provided to permit the introduction of accessory items such as the filter media support belt, as discussed more fully hereinafter.

Drum 10, which is closed at its far end by a plate 13 (shown partly broken away in FIG. 1 and further illustrated in FIG. 2) and is open at its other end, is connected to a rotary axle 14 by a plurality of spokes 16 extending radially outwardly from the axle adjacent both ends of the drum and located on the far side or face of plate 13. The axle is mounted in bearings 18 and 20 and extends through an opening in the far wall of the housing beyond bearing 20 where it is connected to a suitable drive element, such as, for example, a pulley wheel 22. An inlet conduit 24 is provided in the housing through which effluent to be filtered passes, and an outlet conduit 26 is provided to connect with the open end of the drum to permit passage of the filtered gaseous stream.

Outside the housing 12, a roll 28 of fresh filter medium 30 is provided. Filter medium 30 is unwound from the roll and supported by an endless screen 32 which is trained about a major portion of the periphery of the drum 10 and about idler rolls 34 and 36. Spent filter medium is rewound to form roll 38. The screen 32 and medium 30 enter the housing at opening 40 and exit at opening 42 illustrated in FIG. 1. Both openings are provided with suitable seals 44 and 46 which may take the form of flexible lengths of rubber or polytetrafluoroethylene strips, and which prevent loss of gas from the housing. Annular seals 48 and 50, as illustrated in FIG. 2, are provided at the peripheral ends of the drum to prevent passage of effluent from the housing 12 except through the open end of the drum leading into the conduit 26.

FIG. 3 shows the flow of gas to be through conduit 24 and into housing 12 where it is filtered. It leaves the housing through conduit 26, passes through exhaust fan 52 and then conduit 54, which may direct the gas to the atmosphere or to a conventional collecting means (not shown) such as a baffle plate or collection chamber which permits removal of the large reentrained liquid drops from the gas stream.

The drum 10 may be rotated intermittently, moving with it the screen and the filter medium, to advance and reindex the filter medium and expose a fresh filter surface to the incoming gas whenever the filter surface in use becomes loaded to a point which prevents filtration at the desired efficiency or pressure drop. This reindexing can be done automatically, with a suitable drive mechanism such as motor 56 connected to pulley 22 by belt 58. The motor is actuated by sensing devices designed to measure a variable, such as the pressure drop across the face of the filter, or it can be actuated after a period of time predetermined to correspond to an average increase in pressure drop. The spent filter medium can be removed by any suitable means, such as by rewinding the medium, onto roll 38, as illustrated in FIG. 1.

With many liquid particles, at the air stream velocities used the collected liquid can be dislodged from the filter medium in the form of large droplets. This prevents as rapid a loading when filtering liquid particles as would normally occur when filtering solid particles. For this reason, the filter medium need not be indexed as often when filtering liquid particles or predominantly liquid particles as when filtering solid particles or predominantly solid particles.

In an apparatus similar to that shown in FIG. 1 it has been found that it is desirable to periodically rotate the drum to provide fresh unloaded filter over only a fraction of the filter surface. For example, in one embodiment, the drum is rotated through an angle of 60° during each indexing operation so that at the end of an indexing operation about one-third of exposed area of the filter is fresh unloaded filter medium.

The invention is also not limited to use of a rotary drum for supporting and moving filter medium. The medium support could take the form of a pervious flat plate, for example, over which the medium is moved by a support screen or by sliding directly over the plate. If desired, the medium can be introduced to a pervious support by first introducing it in fibrous form into the conduit 24. By virtue of being carried along by the gaseous stream, such fibers are then deposited on the support as the stream passes through the pervious surface of the support.

The high efficiencies achieved in removing submicron particles from a gas stream are improved upon when filtering out larger particles since larger particles are more easily entrapped. Thus the process of this invention need not be limited to the collection of submicron particles, although it is especially effective in their removal, including the sticky submicron particles normally so difficult to remove.

There are two significant advantages to attaining a high efficiency which can be illustrated by comparing a 95 percent efficient process with a 90 percent efficient process for the removal of particulate matter from an industrial effluent. Many gaseous industrial effluents contain particulate impurities over a wide range of particle sizes starting with submicron particles. It should be realized that a 95 percent efficient filtration process passes to the atmosphere only half the quantity of the undesirable liquid particles that are passed by a 90 percent efficient process; in other words, penetration is 5 percent in the former process versus 10 percent in the latter. Submicron particles have been described in the literature as a more serious health problem than larger size particles as it is thought that the submicron particles remain airborne longer and hence are more likely to be inhaled and that these particles are more difficult for the human body to remove by its normal functions. Thus, attaining a highly efficient filtration process removes a higher percentage of the particulate matter and it is believed also removes a significantly higher percentage of the submicron particles.

It has been found that efficient removal of submicron particles from a gas stream also eliminates undesirable odors. Percent odor reduction was found to closely follow the percent particle removal.

While bonded mats of fibers are preferred for handling purposes, filter elements of unbonded fibers appear to perform as efficiently with respect to particle removal. Fibers in bulk form can also be employed in the process of this invention, although again for handling purposes mats of fibers are preferred. Although preferred, the fiber mats need not be in roll form, especially when a continuous operation is not necessary.

At the operating conditions of the process, the fiber mats are compressed by the gas flow. It is preferred not to mechanically precompress the fiber mats in order to avoid the necessity of attendant mechanical equipment and because it is believed that the air compression helps compensate for any variation in mat density over the face of the filter element. It is believed that channeling of the gas flow into areas of lesser density (and hence lesser resistance to flow) is minimized by having the gas compress the filter medium since the gas will tend to effect equalization of density in the fiber mat. That is, areas of the mat having a low density will be compressed to a greater extent than areas having a high density, thus tending to result in equalization of density. This result could not be accomplished when using a fiber mat which is mechanically compressed to a degree greater than that which would occur as a result of the gas flow.

For the noted average fiber diameters, the following approximate ranges of velocity and pressure drop are preferred in carying out the method of this invention: 1 micron fiber — 300 to 850 fpm, 7 to 34 in.; 4.5 micron fiber — 900 to 2,190 fpm, 7 to 38 in., 8.5 micron fiber — 700 to 2,000 fpm, 8 to 38 in.; 10 micron fiber — 800–1,200 fpm, 15 to 32 in. To achieve at least 90 percent efficiency, the following ranges are preferred: 1 micron fiber, 400 – 850 fpm, 11–34 in.; 4.5 micron fiber, 900–2,190 fpm, 7–38 in.; 8.5 micron fiber, 1,000 fpm to 2,000 fpm, 13–38 in.; 10 micron fiber, 850 – 1,200 fpm, 17–32 in. It is still more preferred to operate at pressure drops not exceeding about 30 inches since this amount generally corresponds to the maximum point at which further increases in efficiencies are obtained only at an excessively large increase in pressure drop. For 1 micron fiber, the most preferred velocity is about 600 fpm, and for the 4.5 micron fiber, about 1,700 fpm. Although exceptionally high efficiencies are obtained with 1 micron fibers as the filter medium, the fibers are comparatively expensive. This is one reason why 4.5 micron fibers are most preferred. With respect to horsepower requirements, it is preferred that the power required to remove about 90 percent of the particulate matter does not exceed about 0.04 hp/lb. air/min. As is apparent from FIGS. 7 – 10 each of the tested glass fiber filter medium materials did not require more power than this preferred limit.

With respect to the thickness of the filter medium, a relatively thick layer is generally more efficient in filtering than a relatively thin layer of the same material for a constant velocity, but the pressure drop is greater.

The efficiency also varies in relation to the size of the particles being filtered. The smaller the particle, the greater the difficulty in maintaining high collection efficiency. Hence, for any particular efficiency of collection, a higher velocity and pressure drop are required for smaller particles than for larger particles. This is also true with different size particles in the submicron range.

In order to achieve the beneficial results of the invention it has been found that the average diameter of the fibers in the filter medium be up to about 10 microns and that the filter medium contain a major proportion of glass fibers or fibers having generally similar filtration properties. The use of fibers of up to about 10 microns achieves high efficiencies with low to moderate power consumption while the use of larger diameter fibers requries excessive power to produce high efficiencies, e.g., efficiencies above 95 percent.

Minor amounts of other fibers can be present in the filter medium if they do not undesirably alter the overall physical characteristics exhibited by an all glass fiber filter medium. For example, fibers of very fine diameter can be incorporated into a filter medium primarily composed of glass fibers having average diameters at the upper end of the diameter range of this invention.

It is to be understood that variations and modifications of the present invention may be made without departing from the spirit of the invention. It is also to be understood that the scope of the invention is not to be interpreted as limited to the specific embodiment disclosed herein, but only in accordance with the appended claims when read in the light of the foregoing disclosure.

We claim:

1. A process for filtering submicron as well as larger size liquid and solid particulate material from large volumes of a gas, comprising:
    a. locating a movable, replaceable, porous, gas pervious filter mat sheet comprising glass fibers having an average diameter of about 1 micron to about 10 microns in a gas stream;
    b. passing the gas through a portion of the filter mat sheet at a velocity within the range of about 300 feet per minute to about 4,000 feet per minute and at a pressure drop across the filter mat from about 7 inches of water to about 40 inches of water to remove at least about 80 percent of the particulate material contained in the gas until said protion becomes spent;
    c. removing said spent portion of the filter mat sheet from the gas stream; and
    d. introducing a fresh protion of the filter mat sheet into the gas stream to replace the spent filter mat sheet portion without interrupting the filtering process.

2. The process as claimed in claim 1 wherein said filter mat sheet, in an uncompressed state, has a density that does not exceed about 9 pounds per cubic foot.

3. The process as claimed in claim 1 wherein said fibers are bonded together.

4. The process as claimed in claim 1 wherein said fibers are unbonded.

5. The process as claimed in claim 1 wherein said fiber mat is compressed solely by the action of the gas moving therethrough.

6. The process as claimed in claim 1 wherein liquid particles filtered from the gas are coalesced on the filter mat sheet and relatively large droplets of such coalesced liquids are removed from the filter mat sheet and are thereafter collected.

7. The process as claimed in claim 1 wherein the fresh filter mat sheet which is introduced into the gas stream constitutes only a portion of the filter mat sheet which is exposed to the gas stream.

8. A process for filtering submicron as well as larger size liquid and solid particulate material from large volumes of a gas comprising:

a. locating a movable, replaceable porous, gas pervious filter mat sheet comprising glass fibers having an average diameter of about 1 micron in a gas stream;

b. passing the gas through a portion of the filter mat sheet at a velocity within an approximate rage of 400 to 850 feet per minute and at a pressure drop within an approximate range of 11 to 34 inches of water whereby at least 90 percent of said particulate material can be removed from said gas until said portion becomes spent;

c. removing said spent portion of the filter mat sheet from the gas stream, and d. introducing a fresh portion of the filter mat sheet into the gas stream to replace the spent filter mat sheet portion without interrupting the filtering process.

9. A process for filtering submicron as well as larger size liquid and solid particulate material from large volumes of a gas comprising:

a. locating a movable, replaceable porous, gas pervious filter mat sheet comprising glass fibers having an average diameter of about 3 to about 5 microns in a gas stream;

b. passing the gas through a portion of the filter mat sheet at a velocity within a range of about 900 to 2,190 feet per minute and at a pressure drop within a range of about 7 to 38 inches of water whereby at least 90 percent of said particulate material can be removed from said gas until said portion becomes spent;

c. removing said spent portion of the filter mat sheet from the gas stream; and d. introducing a fresh portion of the filter mat sheet into the gas stream to replace the spent filter mat sheet portion without interrupting the filtering process.

10. A process of filtering submicron as well as larger size liquid and solid particulate material from large volumes of a gas comprising:

a. locating a movable, replaceable, porous, gas pervious filter mat sheet comprising glass fibers having an average diameter of about 8.5 microns in a gas stream;

b. passing the gas through a portion of the filter mat sheet at a velocity within the range of about 1,000 to 2,000 feet per minute and at a pressure drop within a range of about 13 to 38 inches of water whereby at least 90 percent of said particulate material can be removed from said gas until said portion becomes spent;

c. removing said spent portion of the filter mat sheet sheet from the gas stream; and d. introducing a fresh portion of the filter mat sheet into the gas stream to replace the spent filter mat sheet portion without interrupting the filtering process.

* * * * *